May 12, 1942.　　　R. MAYNE　　　2,282,589

WHEEL STRUCTURE

Filed July 12, 1941

Inventor
Robert Mayne
By Willis F. Avery
Atty.

Patented May 12, 1942

2,282,589

UNITED STATES PATENT OFFICE 2,282,589

WHEEL STRUCTURE

Robert Mayne, Akron, Ohio, assignor to The B. F. Goodrich Company, New York, N. Y., a corporation of New York Application July 12, 1941, Serial No. 402,122

3 Claims. (Cl. 295—11)

This invention relates to wheel structures and is of applicability especially where a cushioned sidewise tilting movement is desired in the wheel itself. The invention is useful for example in wheels of vehicles operated over rough ground, as in the case of earth-working and earth-conveying vehicles, where ability of the wheel to tilt laterally renders it able to conform better to the ground and maintain effective ground contact despite irregularities in the ground surface.

The chief objects of the invention are to provide a wheel structure in which an element is capable of a lateral tilting movement with relation to another element, which tilting movement is resisted and cushioned by resilient means; to provide for resiliently resisting and cushioning both rotative movement and lateral tilting movement of an element with relation to another element of the wheel structure; to provide for effecting such cushioning by resilient rubber or other rubber-like material suitably associated in the assembly; and to provide for compactness of structure and convenience of manufacture and assembly and disassembly.

These and further objects will be apparent from the following description, reference being had to the accompanying drawing in which.

Figure 1:
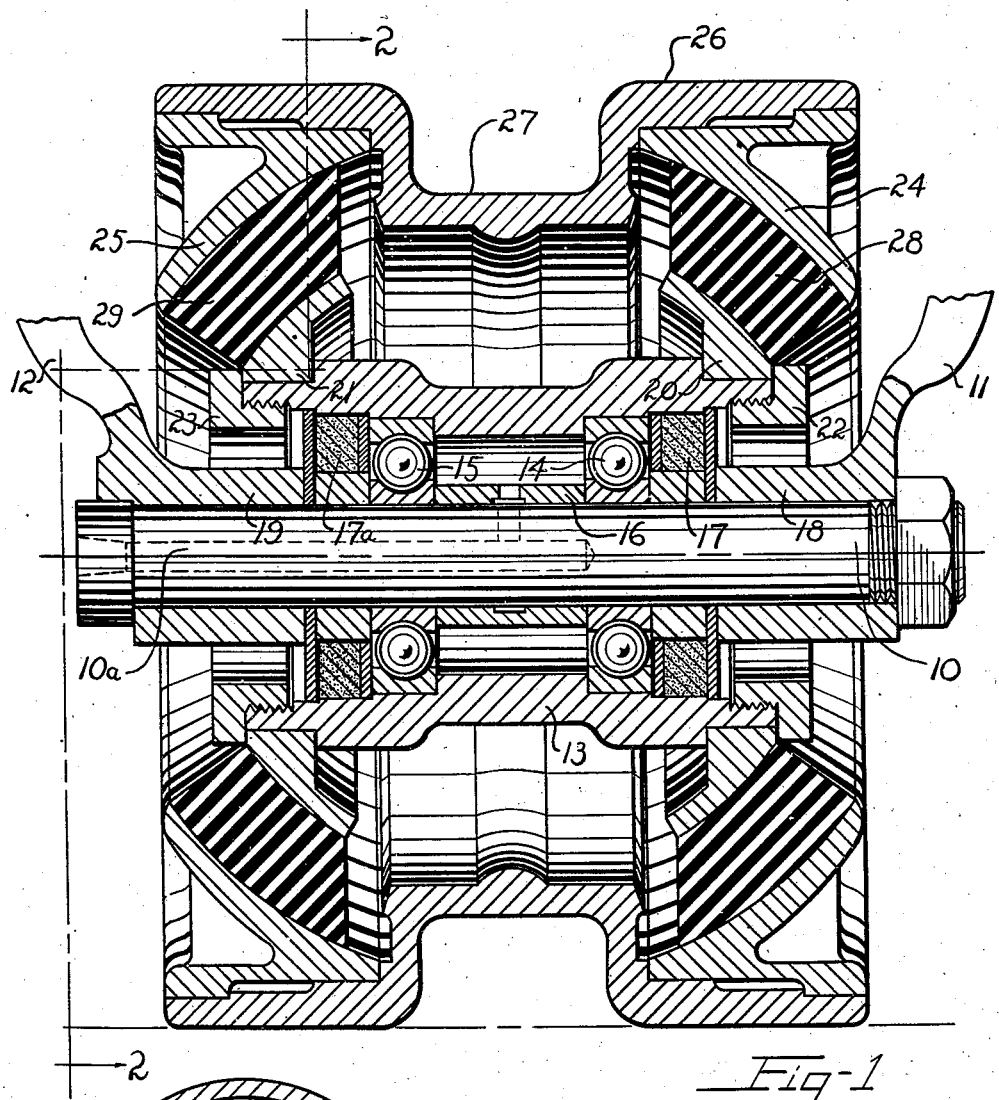
Fig. 1 is a vertical section, as seen from the front, of a wheel assembly constructed in accordance with and embodying the invention.
Figure 2:
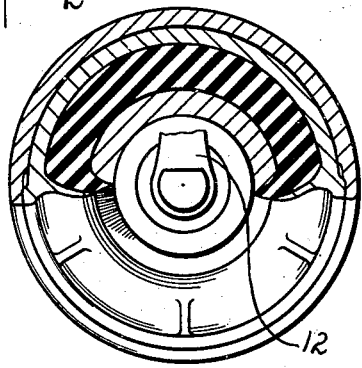
Fig. 2 is a section, on a reduced scale, taken along the line 2—2 of Fig. 1.

In the embodiment illustrated in the drawing the invention is applied to a wheel suitable for use in association with an endless track, as a guiding, driving, or supporting wheel or roller, wherein a metal rim of the wheel bears directly upon the endless track. It will be understood by those skilled in the art however that any suitable form of rim structure may be provided in accordance with the intended use and that the wheel structure is of general applicability in vehicle wheels, including smooth rimmed wheels, cleated wheels, solid tired wheels, and even pneumatic tired wheels.

Concerning the application of the invention to the track roller, with reference to the drawing, the wheel comprises an axle 10 to which are keyed, or otherwise secured, a pair of arms 11, 12 for suitably mounting the wheel structure on the vehicle. A sleeve 13 is mounted for rotation about the axle 10 by means of anti-friction bearings 14, 15 held in axially spaced-apart relation by a spacer 16. Oil sealing rings 17 and 17a resist egress of lubricant from the bearings and also protect the bearings against ingress of foreign matter, and these rings may be held in place by inward projections 18, 19 of the arms 11 and 12 surrounding the axle. The axle 10 may have a cored passage 10a for conducting lubricants to the bearings 14, 15.

Upon the sleeve 13 is mounted a pair of ring elements 20, 21 held in place at the ends of the sleeve by retaining collars 22, 23 threaded into the ends of the sleeve 13, in a manner to compel rotation of the ring elements 20, 21 with the sleeve 13.

Radially outwardly of the ring elements 20, 21 are a second pair of ring elements 24, 25, these latter ring elements being carried within and secured to an outer rim 26, as by forced fit within the ends of the latter. The rim 26 is cylindrical and may comprise a central depression 27 for clearance of or engagement with central guiding elements on the endless track the roller wheel of the drawing being suitable to use for example in the endless track arrangement disclosed in my Patent No. 2,107,490.

Because such endless track is intended for operation over rough terrain some lateral tilting movement of the track is desirable together with a conforming movement of the roller which bears upon the track, and a substantially uniform supporting pressure, despite the tilting of the track. To the end of providing such lateral tilting movement in the wheel itself and for resiliently cushioning such movement in the wheel, as well as providing for the cushioning of rotational torque of the wheel, I provide one or more cushions of resilient rubber or other rubber-like material associated in the wheel structure to cushion such rotational and tilting movements of the outer rim portion of the wheel with respect to the inner portion at the axis. The bodies of resilient rubber or other rubber-like material are indicated at 28, 29, two annular rings of the resilient material being shown, although, if desired, this resilient material may be provided in the form of blocks or sections thereof spaced about the wheel circumference.

In order that the bodies 28 and 29 may be effective to resist both rotative movement and lateral tilting movement of the rim 26 with respect to the axle 10, these bodies as seen in Fig. 1 and the adjoining surfaces of the ring elements 20, 24 and 23, 25 are inclined toward the axis of the wheel in the axially outward direction, and preferably dished to accommodate better the tilting movement. The preferred construction is such that the surfaces are parts of spheres, as shown, which spherical construction makes possible the maintaining of the ring elements in constant distance apart throughout both tilting movements and rotational movements of the rim with respect to the axle. The resilient bodies 28, 29 are suitably secured to the surface of the ring elements, preferably by a vulcanized bond so that all relative movements of the ring members are transmitted through the resilient bodies.

The spherical arrangement described provides for resisting such rotative movements, both rotational and tilting, through circular shear stress in the rubber-like material at substantially a constant rate. In the event it is desired that the resistance of the resilient bodies be rapidly increased as the tilting movement increases, to provide a variable spring rate, the surface of the ring elements may be arranged in a suitable converging manner in the axially outward direction so as to develop compressive stress upon the rubber-like material in addition to the torsional stress, as desired.

Variations may be made without departing from the scope of the invention as it is defined in the following claims.

I claim:

1. A wheel structure comprising a rim depressed centrally providing outwardly facing end sockets for receiving cushioning supports, an axle for said wheel structure, a sleeve rotatable about said axle and spaced radially from said rim, and a pair of cushioning supports seated at the ends of said sleeve in widely spaced-apart relation axially of the wheel and mounted within said sockets, each support comprising a pair of radially spaced-apart ring members mounted on said sleeve and in an end socket respectively, and rubber-like material in the space between said ring members and adhered thereto, said supports providing for extensive cushioned movement of the rim with respect to said sleeve including extensive cushioned tilting movement with respect thereto.

2. A wheel structure comprising an axle, a sleeve rotatable about said axle, a rim spaced radially outward of said sleeve for extensive movement with respect to said axle and sleeve in all directions including extensive tilting movement, said rim and said sleeve having axially spaced-apart sets of ring elements, each set being disposed to one side of a central zone of the wheel structure and consisting of a pair of concentric ring elements having opposed spaced-apart faces converging outwardly toward the axis of the wheel structure, and an annular body of rubber-like material in the space between the faces of each set and adhered thereto in a manner to resist resiliently the relative tilting movement.

3. A wheel structure comprising an axle, a sleeve rotatable about said axle, a rim spaced radially outward of said sleeve for extensive movement with respect to said axle and sleeve in all directions including extensive tilting movement, said rim and said sleeve having axially spaced-apart sets of ring elements, each set being disposed to one side of the central plane of the rim and consisting of a pair of concentric ring elements having opposed spaced-apart faces of spherical curvature having a center at the intersection of the axis of the wheel structure and said central plane, and an annular body of rubber-like material in the space between the faces of each set and adhered thereto in a manner to resist resiliently the relative tilting movement.

ROBERT MAYNE.